United States Patent [19]
Laukien

[11] 3,886,439
[45] May 27, 1975

[54] METHOD OF SEPARATING BROAD AND NARROW LINES OF A FREQUENCY SPECTRUM

[76] Inventor: Günther Rudi Laukien, Am Silberstreifen, 7501, Forchheim, Germany

[22] Filed: Aug. 20, 1973

[21] Appl. No.: 389,453

Related U.S. Application Data

[63] Continuation-in-part of Ser. No. 147,652, May 27, 1971, abandoned.

[30] Foreign Application Priority Data

July 30, 1970 Germany.............................. 2037761

[52] U.S. Cl. ............................. 324/.5 R; 324/.5 AC
[51] Int. Cl. ......................................... G01n 27/78
[58] Field of Search ............... 324/.5 R, .5 A, .5 AC

[56] References Cited
UNITED STATES PATENTS

| | | | |
|---|---|---|---|
| 3,461,381 | 8/1969 | Nelson ............................... | 324/.5 R |
| 3,475,680 | 10/1969 | Anderson ........................... | 324/.5 R |
| 3,609,317 | 9/1971 | Siebert............................... | 324/.5 R |

Primary Examiner—Michael J. Lynch
Attorney, Agent, or Firm—Craig & Antonelli

[57] ABSTRACT

In spin resonance spectrometry, broad and narrow lines can occur simultaneously in the same frequency range. The present invention serves the purpose of separating these lines and achieves such separation by selecting the recording time, with simultaneous excitation and recording of the oscillations of the spectrum in the form of an interferogram, in such a way as to make it start either immediately after excitation of the oscillations and make it very short or delay its beginning for a certain period of time relative to the excitation of the oscillations and then make it relatively long. In the former case, it is mainly the broad lines which are recorded, while the narrow lines are excluded because the recording time is over before the amplitude of narrow lines has reached any significant value. By contrast, the delay in the beginning of the recording time results in the exclusion of the broad lines, because these lines decay very rapidly and thus have more or less disappeared by the time the recording period starts, whilst the narrow lines, which decay very slowly, are more or less recorded without any reduction.

8 Claims, 1 Drawing Figure

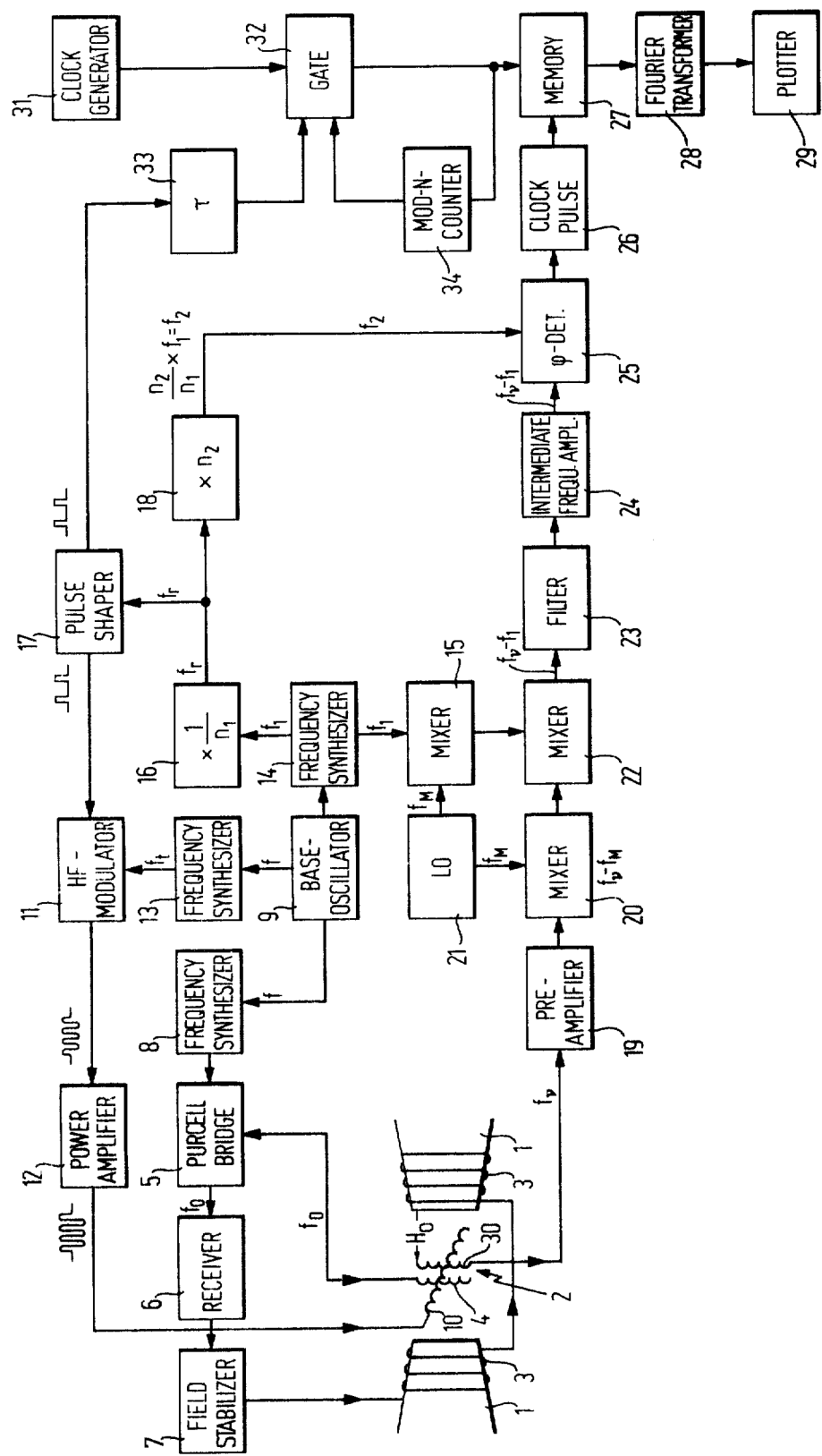

METHOD OF SEPARATING BROAD AND NARROW LINES OF A FREQUENCY SPECTRUM

This is a continuation-in-part of application Ser. No. 147,652, filed May 27, 1971, now abandoned.

The present invention relates to a method of separating broad and narrow lines of a frequency spectrum lying in the same frequency range, especially in spin resonance spectrometry.

It frequently happens that broad and narrow lines occur simultaneously in a frequency spectrum in the same range, which is expressed in the spectrum in such a way that the sharp lines come on top of a broad line which may extend over a whole group of narrow lines. In nuclear spin resonance spectrometry, for instance, such broad and narrow lines occur simultaneously if identical nuclei with an approximately identical chemical shift, i.e., roughly the same shielding of the external field by the electronic shell density, differ in their relaxations. Measurement of the broad and narrow lines thus is an indication of the inner state of motion at the place of the nuclei. Especially in large molecules of the kind occurring in high polymers or biological and medical substances, identical nuclei with a similar molecular binding are found both with high and low mobilities at the place of the binding.

Until now, separation of the broad and narrow lines of a frequency spectrum lying in the same frequency range was not possible, which was detrimental to investigations of the phenomena related to the simultaneous existence of such broad and narrow lines. If the narrow lines appear on a broad line underneath without separation of these lines, it is difficult to decide whether the increase in the initial potential for the narrow lines really is a genuine broad line or whether it is not simply due to disturbances of the conditions of measurement, in nuclear resonance spectrometry, for instance, a lack of homogeneity of the external magnetic field or impurities of the sample with deteriorating effect on homogeneity. Also identifiability of the narrow lines is impaired by such superposition of broad and narrow lines, and it becomes difficult in particular to draw correct conclusions from the measured amplitudes with respect to the basic intensity of the narrow lines. Likewise, it is difficult to investigate the broad lines more closely, e.g., with respect to their shapes, for instance, by application of the mathematical method of the so-called analysis of contained moments, because the shape of the broad line interrupted by sharp lines cannot be recorded with the degree of accuracy required for subsequent evaluation by calculation of the characteristic constants of the shape of the curve.

The present invention is based on the problem of remedying this condition and creating possibilities for recording either the narrow or the broad lines of a frequency spectrum although they are in the same frequency range.

According to the present invention, this problem is solved by simultaneous excitation of all oscillations of the spectrum and their recording as an interference signal, which interference signal is then subjected to a Fourier analysis, and by choosing the recording time so that it either begins immediately after excitation of the oscillations, to exclude the narrow lines, or is made so short that the amplitude of narrow lines remains negligibly small or, to exclude the broad lines, its beginning is delayed relative to the excitation of the oscillations so that the oscillations assigned to the broad lines have largely decayed by the time the recording period begins.

The features of the present invention will now be described in more detail along with a description of an exemplary spectrometer which may be used to perform the method of the present invention, such apparatus being illustrated by the schematic block diagram forming the sole figure of the drawing.

The invention makes use of the fact that broad lines originate from oscillatory modes which are strongly damped, whereas narrow lines are generated by oscillatory modes which have a high quality, i.e., low damping. Accordingly, the oscillations of narrow lines have long relaxation times, keep oscillating for a long time after excitation, whereas the oscillations of broad lines have short relaxation times and thus decay quickly after excitation. Thus, by shifting the beginning of the recording period relative to the moment of excitation of the oscillations, it can be achieved that the oscillations of the broad lines in the measuring interval have decayed so as to disappear in the noise and thus no longer interfere with the measurement of the narrow lines. On the other hand, in the measurement of the broad lines it is ensured by starting the measuring interval coincident with the end of the excitation, that the broad lines are recorded with maximum intensity, and that the resolution is decreased at the same time by a reduction of the measuring interval. For the narrow lines less resolution means artificial broadening of these narrow lines, which spreads the relatively low energy contained in a narrow line also at a relatively high amplitude over a broader frequency band so that the amplitude of this broadened line becomes negligibly small. So, by shortening the recording period or the measuring interval it is possible to keep the amplitude of narrow lines negligibly small. In this way, broad lines can be recorded and evaluated practically without any interference from narrow lines.

In a preferred embodiment of the method according to the invention the instantaneous amplitude of the reference signal is registered at preset time intervals and the frequencies and amplitudes of the oscillations generating the reference signal are determined from the registered amplitudes by calculation. In such an embodiment of the method according to the invention it is particularly advantageous to have also variable lengths of the time intervals between those times at which the instantaneous amplitude of the interference signal is registered. Varying the length of these time intervals allows the determination of the upper limit frequency still included in the recording of the frequency spectrum. As it is, at least three amplitude values must be registered during one period of an oscillation of the spectrum to make such oscillation still identifiable. The time intervals between successive registrations must thus be shorter than half the period of an oscillation whose existence is still to be determined in the Fourier analysis. Hence, a selection of the length of the time intervals between those moments at which the instantaneous amplitude of the interference signal is registered is a method of setting an upper limit to the range of interest of the spectrum.

It is advantageous for the execution of the method according to the invention if the interference signal is transformed into a suitable frequency range prior to registration. Since the interference signals as a rule are converted into electrical signals which are most suitable for registration and processing, such transformation of the interference signals prior to registration can simply be made by superposition with a suitable radio frequency signal. For instance, the measurement frequencies in nuclear resonance spectrometry are in the 100 MHz range, while the spectra proper have widths in the range of 1 kHz. The ratio between the width of the spectrum and the mean frequency of the spectrum thus is $10^{-5}$. It is selfevident that it would be very difficult technically in this case to resolve the interval between 100,000 and 101,000 kHz and, in particular, to fix even narrower limits. However, if the frequency range is transformed into the range of 1 kHz, this frequency range can easily be investigated without any major expenditure in terms of equipment. Unless the original interference signal is already in a low frequency range, such transformation also allows a limitation of the frequency range of the interference signal by means of filters.

The method according to the invention can be implemented by means of the usual devices for recording and Fourier analysis of interference signals having a computer with a memory for registration of the instantaneous amplitude of the interference signal at predetermined intervals of time. In that case it is sufficient to provide for time switches for the registration device which allow setting of the time difference between the beginning of the period of registration and the onset of the interference signal, and the length of the measurement interval. Moreover, such device must include a suitable timing pulse generator to determine the time intervals between the times at which the instantaneous amplitude of the interference signal is scanned and referred to the store. Such time switches and timing pulse generators are familiar to those skilled in the art just as their employment in such devices and proper programming of the computers.

An exemplary embodiment for a device suitable for conducting the process of this invention is shown in the appended drawing in the form of a block circuit diagram. This device is the nuclear resonance spectrometer described in U.S. Pat. No. 3,720,816 of Mar. 13, 1973, which, in accordance with the foregoing description, has been supplemented by a timing circuit and clock generator. The general construction, as well as the mode of operation of such nuclear resonance spectrometers making use of Fourier analysis are described, for example, in an article by R. R. Ernst and W. A. Anderson in "The Review of Scientific Instruments," vol. 37, No. 1 (Jan. 1966), pp. 93–102.

The spin resonance spectrometer shown in the FIGURE comprises a magnet 1 in the air gap of which the test pieces to be investigated for spin resonances are arranged. The magnetic field $H_o$ in the air gap 2 is held in a fixed gyromagnetic ratio to a spin resonance reference frequency $f_o$ by means of a winding 3 arranged on the magnet, to which the reference frequency $f_o$ is supplied by means of a measuring coil 4 is connected to a detector arrangement 5, for example a Purcell bridge, which produces a detector signal dependent on the frequency $f_o$ and supplies this detector signal through a receiver 6 to a field stabilizing unit 7 which feeds the winding 3 of the magnet 1 with such a current that the spin resonance reference frequency $f_o$ of the reference sample stands in the desired gyromagnetic ratio to the measuring field $H_o$. The frequency $f_o$ used for exciting the reference sample is supplied to the detector arrangement 5 from a frequency synthesizer 8 to which a primary frequency $f$ is supplied from a fundamental oscillator 9. The use of a frequency synthesizer 8 has the advantage that the reference frequency $f_o$ can be adjusted to the reference sample used independently of the frequency $f$ of the fundamental oscillator.

The sample to be investigated by means of the spin resonance spectrometer according to the FIGURE is also located in the air gap 2 of the magnet 1 and high frequency pulses are periodically fed to this sample by means of an exciting coil 10 which is supplied from an HF modulator 11 and an output amplifier 12 before reaching the exciting coil 10. The HF modulator is supplied with a high frequency $f_t$ by a second frequency synthesizer 13 connected to the fundamental oscillator 9 and which frequency $f_t$ stands in a definite ratio to the reference frequency $f_o$ and is so chosen that it lies in the band of the resonance frequencies of the sample to be investigated which is located in the air gap 2. These reference frequencies $f_r$ are extracted by means of a coil 30 and supplied to the analysis means still to be described.

A third frequency synthesizer 14 is connected to the fundamental oscillator 9 which produces a first local frequency $f_1$. This local frequency is moreover fed to a mixer 15 and to a divider stage 16 in which the frequency $f_1$ is divided in the ratio $f_r = f_1/n$.

The frequency $f_r$ is supplied as a pulse repetition frequency to a pulse shaper 17 which is connected to the HF modulator 11 and determines the repetition frequency as well as the shape of the HF pulse at the carrier frequency $f_t$. The frequency $f_r$ is furthermore supplied to a multiplier 18 in which it is multiplied by the factor $m$. The output signal of the multiplier 18 serves as a reference signal $f_2 = (n_2/n_1) f_1$.

The signal extracted by means of the coil 30 is supplied to a pre-amplifier 19 and then to a second mixer 20 which, like the first mixer 15 to which the first local frequency $f_1$ is supplied, receives a local signal $f_M$ from a local oscillator 21.

The output signals of the two mixers 15 and 20 pass after amplification to a further mixer 22 to which a filter 23 is connected. This filter is a band pass filter. The output of the filter 23 after passing an intermediate frequency amplifier 24 is fed to a phase detector 25 operating as a mixer which receives as a reference signal the difference frequency $f_2$ from the multiplier 18. The output signal of the phase detector 25 is fed to a low pass filter 26 the output signal of which is fed into a store 27 in step with a signal from the clock generator 31. The signals contained in the store 27 are manipulated by a Fourier converter 28 which may be, for example, a Fourier-Analyzer 5450A, as manufactured by the Hewlett Packard Corporation, Palo Alto, Calif. The result of this manipulation is indicated by means of a recorder 29 connected to the Fourier converter 28.

During the measurement of the spectra by means of the device described partial magnetizations of the sample which pertain to the various resonance lines and which are formed in the direction of the field in the static magnetic field $H_o$ on completion of the relaxation of the system are all rotated simultaneously, for example through 90°, in the plane perpendicular to the static field direction by the HF pulse produced in the HF modulator 11, amplified in the power amplifier 12 and fed to the sample through the exciting coil 10.

After the end of this pulse when therefore all partial magnetizations have executed a rotation through 90° these partial magnetizations execute a precession in the plane perpendicular to the direction of the field. Since the resonance frequencies pertaining to the individual partial magnetizations are different the precession speeds are also different (see G. Laukien "Kernmagnetische Hochfrequenzspektroskopie," Handbuch der Physik, Volume 38/1). The precession movements of the spin induce voltages in the detector coil 30 which permit observation of the precession movements. These induced voltages then form an interference signal since the induction voltages pertaining to the individual resonance lines are superimposed on one another. By means of the device according to the FIGURE this interference signal is converted in several stages into a suitable intermediate frequency range and then subjected to a Fourier conversion in order to determine the oscillations contained in the interference signal. The clock pulses delivered by the clock generator 31, which control the read-in of the signals supplied by the filter 26 into the storage means 27, are fed to the storage means via a gate 32 which is opened by a pulse transmitted by the pulse shaper 17. The pulse delivered by the pulse shaper 17, which determines the position in time and the duration of the HF pulse, passes through an adjustable delay member 33 before being fed to the gate 32, so that the gate 32 is opened at a chronological interval after the occurrence of the HF signal, selectable with the aid of the delay member 33, and thus is opened at a selectable interval after the beginning of the excitation of the oscillations. The clock signals passing through the gate 32, in addition to being applied to the storage means 27, also are fed to a mod-N counter 34, the counting capacity of which is equal to the number of positions in the storage means 27. Accordingly, the mod-N counter 34 executes a full counting cycle and returns to its zero condition once all positions of the storage means 27 have been filled. Upon return to the zero condition, the mod-N counter 34 emits an output signal which is fed to the gate 32 and closes the latter, so that the supply of additional clock signals from the clock generator 31 to the storage means 27 is blocked. The frequency of the clock pulses supplied by the clock generator 31 is adjustable, so that the time period required for filling the storage means 27 can be varied. This means that the input time can be selectable without a portion of the storage means remaining unused. Therefore, the maximum resolution attainable by the storage capacity is always obtained.

If it is intended, according to the process of this invention, to record essentially only broad lines which fade very quickly, the delay time τ at the delay member 33 is adjusted so that the gate 32 is opened immediately upon the fading of the HF pulse, by means of which all oscillations of the spectrum are excited simultaneously, so that the input time determined by the feeding of clock pulses to the storage means 27 begins directly after the excitation of the oscillations. Ath the same time, the frequency of the clock pulses supplied by the clock generator 31 is selected to be so high that the number of clock pulses required for filling the storage means 27 is fed within a short time period, the gate 32 is again closed by the mod-N counter 34, and the input time is terminated as long as the amplitude of narrow lines remains negligibly small.

In contrast thereto, for the elimination of broad lines, the beginning of the input time can be shifted with the aid of the delay member 34 with respect to the excitation of oscillations taking place during the signal supplied by the pulse shaper 17 to such an extent that the oscillations associated with the broad lines have already substantially faded at the beginning of the input time. The frequency of the clock generator 31 can then be set so that optimum relationships result in view of the resolution and the detected frequency range.

What is claimed is:

1. A method of separating broad and narrow lines of a frequency spectrum in the same frequency range in spin resonance spectrometry, comprising the steps of:
    exciting all of the oscillations of the spectrum at the same time in a given substance;
    selectively recording those oscillations corresponding to only one of said broad and narrow lines in the form of an interference signal by recording the oscillations produced in said substance during only a selected portion of the time interval during which said all of the oscillations of the spectrum are produced; and
    subjecting said interference signal to Fourier analysis.

2. The method according to claim 1, wherein said step of selectively recording comprises the step of recording the oscillations produced in said substance in the form of an interference signal for only the portion of said time interval commensing immediately after excitation of said oscillations and which portion is sufficiently short to exclude the narrow lines, whereby said broad lines of the frequency spectrum are selectively recorded.

3. The method according to claim 1, wherein said step of selectively recording comprises the step of recording the oscillations produced in said substance in the form of an interference signal for only the portion of said time interval commensing a sufficient time after excitation of said oscillations that most of the oscillations assigned to the broad lines have decayed by the time the recording begins, whereby said narrow lines of the frequency spectrum are selectively recorded.

4. The method according to claim 1, further including the steps of registering the instantaneous amplitudes of said interference signal during selected time periods, and determining the frequencies and amplititudes of the oscillations forming the interference signal from said registered instantaneous amplitudes.

5. The method according to claim 4 further including the step of varying the lengths of the periods of time between the times at which the instantaneous amplitude of the interference signal is registered.

6. The method according to claim 4, further including the step of transforming said interference signal into a suitable frequency range prior to registration thereof.

7. The method according to claim 6, further including the step of limiting the range of frequencies of the interference signal by means of filters prior to registration thereof.

8. The method according to claim 7, further including the step of limiting the range of frequencies of the interference signal by means of filters subsequent to transformation thereof.

* * * * *